Patented June 10, 1930

1,762,513

UNITED STATES PATENT OFFICE

HENRY A. GARDNER, OF WASHINGTON, DISTRICT OF COLUMBIA

LAMINATED GLASS

No Drawing.   Application filed May 23, 1927. Serial No. 193,736.

This invention relates to reinforced or laminated glass of the kind wherein a plurality of sheets of glass are united together into one composite body, or laminated, by means of a non-brittle binder with or without additional adhesives and/or strengthening agents.

Heretofore, in the preparation of such reinforced or laminated glass, there have been used as non-brittle binders celluloid, pyroxylin, and other cellulose ester and ether compositions. In order to increase the adhesion between the sheet or sheets of non-brittle binder and the opposing surfaces of the glass sheets it has been proposed to preliminarily coat or otherwise treat the opposed surfaces of the glass sheets, and/or the surfaces of the sheet or sheets of non-brittle binder, with solutions of adhesives such as, for example, gelatin, isinglass and dextrin, colophony and castor oil, and the like. Application of pressure, or of pressure and heat, unites together, or laminates, the said components into a unitary whole. Generally, it has been necessary to restrict the thickness of the sheet of non-brittle binder to that of a mere film,— say to a thickness of about two one-hundredths of an inch,—since the commonly used non-brittle binders either initially are not as transparent as glass or else, while being apparently clear, possess an objectionable tendency to assume a marked coloration upon exposure to ultra-violet light. The above mentioned tendency apparently is due to the fact that certain of the commonly used non-brittle binders absorb, rather than transmit, ultra-violet light; the so absorbed ultra-violet light is converted into chemical energy which causes a marked yellowing and early destruction of the binder.

An object of the present invention therefore is to provide a reinforced or laminated glass of the general type above mentioned which not only possesses great strength and particularly the ability to resist shock but also has a relatively permanent transparency and freedom from discoloration.

It has now been found that a reinforced or laminated glass having the above mentioned, and other, desirable characteristics may be obtained through the use as the non-brittle binder of a synthetic resin, such as a resin obtained by condensing an organic nitrogen compound with an aldehyde. The resinous products which I prefer to use are the toluol sulfonamide-aldehyde resins,— particularly the paratoluol sulfonamide-formaldehyde resin,—described in my U. S. Patent No. 1,564,664, which resins have the peculiar property of making useful films either alone or in combination with cellulose esters or organo-oxy-cellulose compounds generally, the durability of which films under exposure to ultra-violet light appears to be greater than that of films of cellulose esters alone or in combination with resins of other types. This property inherent in the synthetic resins of the paratoluol sulfonamide-formaldehyde resin type probably is due to the fact that said resins are very clear and transmit exceptionally high percentages of ultra-violet light, with practically no absorption of the same and consequent decomposition.

It has been observed, further, that the incorporation of the said resin with an organo-oxy-cellulose compound not only increases the adhesive property of the organo-oxy-cellulose compound but also improves the same with respect to transparency and to ability to transmit ultra-violet light.

In making such reinforced glass according to the present invention I may, for instance, proceed as follows:

*Example 1.*—50 grams of paratoluol-sulfonamide-formaldehyde resin are dissolved in 50 grams of a suitable volatile solvent, such as, for example, toluol. The opposing clean surfaces of the glass sheets which are to be laminated together are coated with this solution. After brief drying, the coated surfaces are pressed together, preferably, although not necessarily, with heating. Ordinarily, the combination of pressure and heat effects a more permanent binding action on the part of the resin than does pressure alone.

*Example 2.*—The opposing surfaces of the glass sheets which are to be laminated together are coated with a cement having the following composition:

| | Grams |
|---|---|
| Low viscosity nitrocellulose | 25 |
| Butyl acetate | 75 |
| Paratoluol - sulfonamide - formaldehyde resin | 50 |
| Toluol | 50 | and the so-treated sheets are, after a brief drying, laminated together in the known manner. Preferably, the laminating operation is effected by the aid of both pressure and heat; heating after the pressing being the equivalent of coincident pressing and heating. Heating is highly desirable with some types of synthetic resins when used in this connection, in view of the fact that the reactions thereby brought about effect the formation of especially firm masses.

The nitrocellulose content of the above composition may be replaced by an equivalent amount of another suitable cellulose ester or ether, say, cellulose acetate, provided the type of solvent is adjusted to carry the cellulose ester or ether selected.

*Example 3.*—An organo-oxy-cellulose ingredient may not only be added to the non-brittle binder as a solution of the same in an appropriate solvent, as described in Example 2, but also an organo-oxy-cellulose ingredient, such as, for example viscose, celluloid, or the like, may be used in the form of a thin sheet or film, as an additional strengthening medium, interposed between the surfaces of the glass sheets coated with the paratoluol sulfonamide-formaldehyde resin-containing solution or cement described in Examples 1 and 2. Also, such organo-oxy-cellulose films or thin sheets may themselves be coated with the cements described in Examples 1 and 2 prior to the laminating operation.

*Example 4.*—If desired, the toluol sulfonamide-aldehyde resin may be used in the absence of a solvent, by merely applying it to the surfaces of the glass sheets in a heated, semi-fluid condition by means of a warm roll or similar device. Or, a composition consisting essentially of the said resin and an organo-oxy-cellulose compound may be similarly applied. In this connection also, there may be produced a thin sheet of the said resin, or of a composition comprising the said resin and a cellulose ester, such as, for example, nitro-cellulose, which sheet may be interposed between the glass sheets (which latter may or may not have received a preliminary coating of the solutions or cements described in Examples 1 and 2), with heating and pressure, whereby to produce a laminated structure.

An equivalent procedure consists in combining thin sheets or films of celluloid, viscose, or the like, with the aforesaid resin-containing sheets or films, as the non-brittle, binding laminæ.

I claim:

1. As an article of manufacture, a composite body comprising a plurality of glass sheets firmly united together by means of a non-brittle binder containing a toluol sulfonamide-aldehyde resin, said binder being resistant to discoloration by ultra-violet light.

2. As an article of manufacture, a composite body comprising a plurality of glass sheets firmly united together by means of a non-brittle binder containing a paratoluol sulfonamide-formaldehyde resin.

3. As an article of manufacture, a composite body comprising a plurality of glass sheets firmly united together by means of a non-brittle binder containing a toluol sulfonamide-aldehyde resin and an organo-oxy-cellulose compound said binder being resistant to discoloration by ultra-violet light.

4. As an article of manufacture, a composite body comprising a plurality of glass sheets firmly united together by means of a non-brittle binder containing a paratoluol-sulfonamide-formaldehyde resin and an organo-oxy-cellulose compound.

5. As an article of manufacture, a composite body comprising a plurality of glass sheets firmly united together by means of a non-brittle binder containing a paratoluol-sulfonamide-formaldehyde resin and a nitrocellulose compound.

In testimony whereof, I affix my signature.

HENRY A. GARDNER.